(12) United States Patent
Itadani et al.

(10) Patent No.: US 7,692,747 B2
(45) Date of Patent: Apr. 6, 2010

(54) IN-PLANE SWITCHING MODE LIQUID CRYSTAL DISPLAY DEVICE HAVING A BIAXIAL OPTICALLY ANISOTROPIC MEMBER

(75) Inventors: Motohiro Itadani, Ota-ku (JP); Shuhei Okude, Yokohama (JP); Shunsuke Yamanaka, Takaoka (JP); Kohei Arakawa, Machida (JP)

(73) Assignee: Zeon Corporation, Tokyo (JP)

( * ) Notice: Subject to any disclaimer, the term of this patent is extended or adjusted under 35 U.S.C. 154(b) by 961 days.

(21) Appl. No.: 10/579,738

(22) PCT Filed: Nov. 18, 2004

(86) PCT No.: PCT/JP2004/017540

§ 371 (c)(1),
(2), (4) Date: May 18, 2006

(87) PCT Pub. No.: WO2005/050300

PCT Pub. Date: Jun. 2, 2005

(65) Prior Publication Data

US 2009/0103012 A1    Apr. 23, 2009

(30) Foreign Application Priority Data

Nov. 21, 2003    (JP)    ............... 2003-393019

(51) Int. Cl.
G02F 1/1335    (2006.01)
G02F 1/1343    (2006.01)
(52) U.S. Cl. .................. 349/118; 349/117; 349/141
(58) Field of Classification Search .................. 349/118, 349/141
See application file for complete search history.

(56) References Cited

U.S. PATENT DOCUMENTS

| | | | |
|---|---|---|---|
| 4,402,927 A | 9/1983 | von Dardel et al. | |
| 4,432,956 A | 2/1984 | Zarzycki et al. | |
| 4,610,863 A | 9/1986 | Tewari et al. | |
| 5,124,364 A | 6/1992 | Wolff et al. | |
| 5,137,279 A | 8/1992 | Murphy et al. | |
| 6,115,095 A | 9/2000 | Suzuki et al. | |
| 6,184,957 B1 | 2/2001 | Mori et al. | |
| 6,417,904 B1 * | 7/2002 | Yamaoka et al. | ............ 349/117 |

(Continued)

FOREIGN PATENT DOCUMENTS

JP    7-261152 A    10/1995

(Continued)

*Primary Examiner*—Michael H Caley
(74) *Attorney, Agent, or Firm*—Birch, Stewart, Kolasch & Birch, LLP

(57) ABSTRACT

A liquid crystal display device of an in-plane switching mode comprises at least an optically anisotropic member and a liquid crystal cell disposed between a pair of polarizers having absorption axes disposed approximately perpendicularly to each other, wherein $n_z > n_x > n_y$ ($n_x$: a refractive index (n) in the direction of the in-plane slow axis; $n_y$: n in the in-plane direction perpendicular to the above direction; $n_z$: n in the direction of thickness, each at 550 nm); the optically anisotropic member comprises a layer comprising a material having a negative value of intrinsic birefringence; and the in-plane slow axis of the optically anisotropic member is approximately parallel or perpendicular to the absorption axis of a polarizer closer to the member. The antireflection property, scratch resistance and durability are excellent, the angle of field is wide, and uniform display of images with great contrast can be achieved at any angle of observation.

10 Claims, 4 Drawing Sheets

VISION SIDE

BACKLIGHT SIDE

U.S. PATENT DOCUMENTS

| | | |
|---|---|---|
| 2002/0196901 A1 | 12/2002 | Inoue |
| 2003/0122991 A1 | 7/2003 | Itakura et al. |
| 2004/0101106 A1 | 5/2004 | Inoue |

FOREIGN PATENT DOCUMENTS

| | | |
|---|---|---|
| JP | 10-54982 A | 2/1998 |
| JP | 10-307291 A | 11/1998 |
| JP | 11-133408 A | 5/1999 |
| JP | 11-305217 A | 11/1999 |
| JP | 2001-233611 A | 8/2001 |
| JP | 2002-321302 A | 11/2002 |
| JP | 2003-149642 A | 5/2003 |
| JP | 2003-149643 A | 5/2003 |
| JP | 2003-195310 A | 7/2003 |
| JP | 2003-246014 A | 9/2003 |
| JP | 2003-270435 A | 9/2003 |

* cited by examiner

VISION SIDE

BACKLIGHT SIDE

BACKLIGHT SIDE

VISION SIDE

IN-PLANE SWITCHING MODE LIQUID CRYSTAL DISPLAY DEVICE HAVING A BIAXIAL OPTICALLY ANISOTROPIC MEMBER

TECHNICAL FIELD

The present invention relates to a liquid crystal display device. More particularly, the present invention relates to a liquid crystal display device which exhibits excellent antireflection property, scratch resistance and durability, provides a wide angle of field and achieves uniform display of images with great contrast at any angle of observation.

BACKGROUND ART

Liquid crystal display devices are characterized by the high quality of images, the small thickness, the light weight and the small consumption of electric power and widely used for televisions, personal computers and automobile navigators. It has been pointed out that liquid crystal display devices have a drawback in that brightness, color and contrast vary to a great extent and difficulty arises in watching images when the images are observed at oblique angles.

To overcome the drawback, improvements in the design of the liquid crystal cell itself have been studied, and a liquid crystal display device of the in-plane switching mode is proposed as one of the improvements (for example, Patent Reference 1). In accordance with the proposed technology, the angle of field is improved in comparison with that of liquid crystal display devices of other modes. However, in accordance with this technology, the arrangement of polarizer plates shifts from the cross-nichol arrangement depending on the angle of observation, and this causes a decrease in the angle of field due to leak of light although the decrease in the angle of field due to the liquid crystal molecules in the liquid crystal cell is relatively suppressed. Moreover, further improvement is desired with respect to the narrow angle of field due to the liquid crystal molecules in the liquid crystal cell. Therefore, it is attempted that the decrease in the contrast of images is suppressed by adding a means for optical compensation to the liquid crystal display devices of the in-plane switching mode.

For example, a liquid crystal display device in which a sheet for optical compensation is disposed between a liquid crystal cell and at least one of polarizer plates, the sheet for optical compensation is optically negatively uniaxial, and the optical axis is parallel to the face of the sheet, is proposed (Patent Reference 2).

As another liquid crystal display device of the in-plane switching mode, a liquid crystal display device in which a first polarizer plate, a film for optical compensation, a first substrate, a liquid crystal layer, a second substrate and a second polarizer plate are disposed in this order, one of the polarizer plates has a transmission axis parallel to the slow axis of the liquid crystal during the dark display of the liquid crystal layer, and the angle between the slow axis of the film in the sheet for optical compensation and the transmission axis in one of the polarizer plates is 0 to 2° or 88 to 90°, is proposed (Patent Reference 3).

However, none of these means are sufficient for providing a liquid crystal display device which exhibits uniform display of images with a great contrast at any angle of observation, and further improvement has been desired.

[Patent Reference 1] Japanese Patent Application Laid-Open No. Heisei 7 (1995)-261152

[Patent Reference 2] Japanese Patent Application Laid-Open No. Heisei 10 (1998)-054982

[Patent Reference 3] Japanese Patent Application Laid-Open No. Heisei 11 (1999)-305217

DISCLOSURE OF THE INVENTION

The present invention has an object of providing a liquid crystal display device which exhibits excellent antireflection property, scratch resistance and durability, provides a wide angle of field and achieves uniform display of images with great contrast at any angle of observation.

As the result of intensive studies by the present inventors to overcome the above problems, it was found that the decrease in the contrast could be prevented and a liquid crystal display device of the in-plane switching mode exhibiting a wide angle of field with a great contrast could be obtained when a layer of an optically anisotropic member having a negative value of intrinsic birefringence was disposed at a specific position relative to the liquid crystal cell and the polarizers and an optically anisotropic member satisfying the relation $n_z > n_x > n_y$ was disposed at a specific position relative to the liquid crystal cell and the polarizers, wherein the refractive index of the optically anisotropic member in the direction of the in-plane slow axis was represented by $n_x$, the refractive index in the direction in-plane and perpendicular to the direction of the in-plane slow axis was represented by $n_y$, and the refractive index in the direction of the thickness was represented by $n_z$. The present invention has been completed based on the knowledge.

The present invention provides:

(1) A liquid crystal display device of an in-plane switching mode which comprises a pair of polarizers which are a polarizer at an output side and a polarizer at an incident side and disposed at relative positions such that absorption axes of the polarizers are approximately perpendicular to each other and at least an optically anisotropic member and a liquid crystal cell which are disposed between the pair of polarizers, wherein $n_z > n_x > n_y$ when, with respect to the optically anisotropic member, a refractive index in a direction of an in-plane slow axis is represented by $n_x$, a refractive index in a direction in-plane and perpendicular to the direction of an in-plane slow axis is represented by $n_y$, and a refractive index in a direction of a thickness is represented by $n_z$, each measured using light having a wavelength of 550 nm; and the in-plane slow axis of the optically anisotropic member and the absorption axis of a polarizer disposed closer to the optically anisotropic member are disposed at relative positions approximately parallel or approximately perpendicular to each other;

(2) The liquid crystal display device described in (1), wherein the absorption axis of the polarizer at the output side and the in-plane slow axis of a liquid crystal of the liquid crystal cell under application of no voltage are disposed at relative positions parallel to each other, and the optically anisotropic member is disposed between the liquid crystal cell and the polarizer at the output side;

(3) The liquid crystal display device described any one of (1) and (2), wherein the in-plane slow axis of the optically anisotropic member and the in-plane slow axis of a liquid crystal of the liquid crystal cell under application of no voltage are disposed at relative positions approximately perpendicular to each other:

(4) The liquid crystal display device described in any one of (1) to (3), wherein the optically anisotropic member comprises a layer comprising a material having a negative value of intrinsic birefringence;

(5) The liquid crystal display device described in any one of (1) to (4), wherein a transparent resin is laminated to at least one face of a layer of the optically anisotropic member;

(6) The liquid crystal display device described in (5), wherein the transparent resin is a polymer resin having an alicyclic structure;

(7) The liquid crystal display device described in any one of (1) to (6), wherein a content of residual volatile components in the optically anisotropic member is 0.1% by weight or smaller; and (8) The liquid crystal display device described in any one of (1) to (7), wherein a protective film of a polarizer at a side of vision in the liquid crystal display device comprises a low refractive index layer which is formed with aero gel and has a refractive index of 1.36 or smaller.

As the preferable embodiments, the present invention provides:

(9) A liquid crystal display device which comprises a pair of polarizers disposed at relative positions such that transmission axes of the polarizers are approximately perpendicular to each other and at least an optically anisotropic member and a liquid crystal cell which are disposed between the pair of polarizers, wherein the optically anisotropic member comprises a layer of a material having a negative value of intrinsic birefringence, and the in-plane slow axis of the optically anisotropic member and the absorption axis of a polarizer disposed closer to the optically anisotropic member are disposed at relative positions approximately parallel or approximately perpendicular to each other.

To summarize the advantages of the present invention, the liquid crystal display device of the present invention exhibits excellent antireflection property, scratch resistance and durability, provides a wide angle of field and achieves uniform display of images with great contrast at any angle of observation. Therefore, the device can be advantageously used as a flat panel display having a great area.

In the present invention, the contrast (CR) means contrast expressed by $(CR)=Y_{ON}/Y_{OFF}$, wherein $Y_{OFF}$ represents the luminance during the dark display of a liquid crystal display device, and $Y_{ON}$ represents the luminance during the bright display of the liquid crystal display device. The greater the value of CR is, the better the visibility is. The bright display means the condition where the brightness of the liquid crystal display is the greatest. The dark display means the condition where the brightness of the liquid crystal display is the smallest. In the present invention, the polar angle means the angle between the direction of the observation and the direction directly in front of the display when the face of the liquid crystal display is observed.

Figure 1:
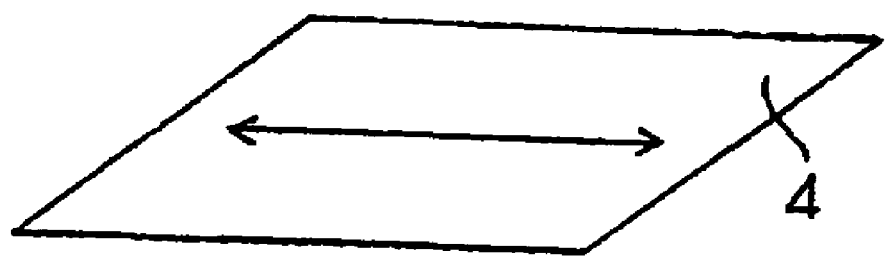
FIG. 1 shows a diagram exhibiting a preferable arrangement in the liquid crystal display device of the present invention.
Figure 1:
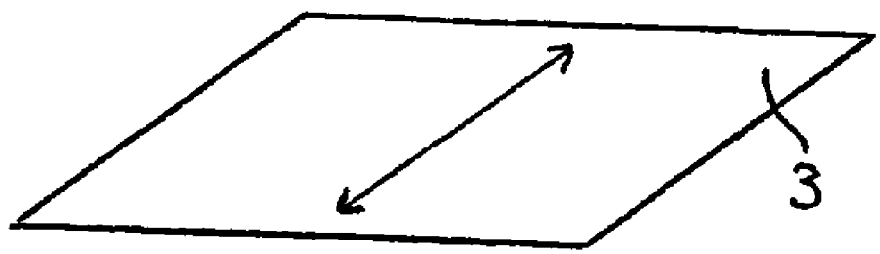
Figure 1:
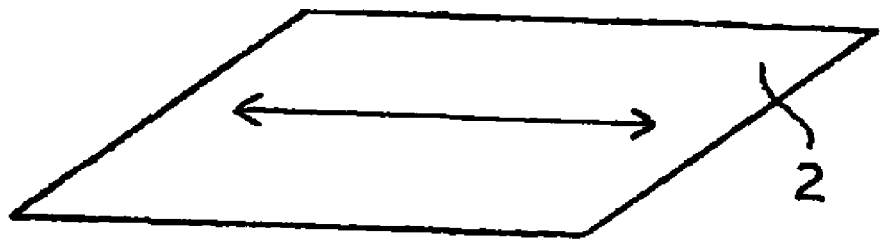
Figure 1:
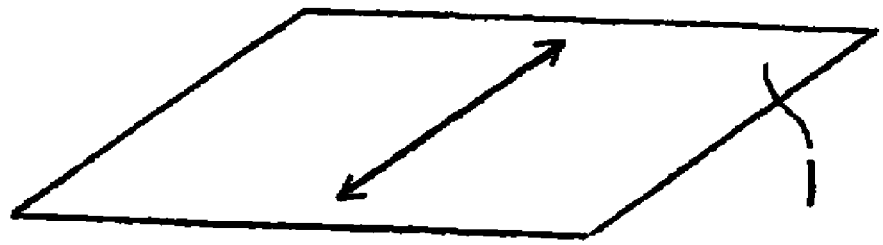

The numbers in the Figures have the following meanings:
1: A polarizer of the incident side
2: A liquid crystal cell
3: An optically anisotropic member
4: A polarizer at the output side

THE MOST PREFERRED EMBODIMENT TO CARRY OUT THE INVENTION

In the liquid crystal display device of the present invention, $n_z>n_x>n_y$, when, with respect to the optically anisotropic member, the refractive index in the direction of the in-plane slow axis is represented by $n_x$, the refractive index in the direction in-plane and perpendicular to the direction of the in-plane slow axis is represented by $n_y$, and the refractive index in the direction of the thickness is represented by $n_z$, each measured using light having a wavelength of 550 nm. When the optically anisotropic member does not satisfy the above relation, there is the possibility that the contrast of the liquid crystal display device is decreased from that obtained when the optically anisotropic member is not disposed.

It is preferable that the optically anisotropic member used in the present invention comprises a layer comprising a material having a negative value of intrinsic birefringence. The material having a negative value of intrinsic birefringence means a material exhibiting a property such that, when light is incident on a layer having molecules oriented in the uniaxial order, the refractive index with respect to light in the direction of the orientation is smaller than the refractive index with respect to light in the direction perpendicular to the direction of the orientation.

Examples of the material having a negative value of intrinsic birefringence include vinyl aromatic polymers, polyacrylonitrile-based polymers, polymethyl methacrylate-based polymers, cellulose ester-based polymers and multi-component copolymers derived from these polymers. The material having a negative value of intrinsic birefringence may be used singly or in combination of two or more. Among these materials, vinyl aromatic polymers, polyacrylonitrile-based polymers and polymethyl methacrylate-based polymers are preferable, and vinyl aromatic polymers are more preferable since the birefringence is exhibited to a great degree.

Examples of the vinyl aromatic polymer include polystyrene and copolymers of vinyl aromatic monomers such as styrene, α-methylstyrene, o-methylstyrene, p-methylstyrene, p-chlorostyrene, p-nitrostyrene, p-aminostyrene, p-carboxystyrene and p-phenylstyrene with other monomers such as ethylene, propylene, butadiene, isoprene, (meth)acrylonitrile, α-chloroacrylonitrile, methyl (meth)acrylate, ethyl (meth)acrylate, (meth)acrylic acid, maleic anhydride and vinyl acetate. Among these polymers, polystyrene and copolymers of styrene and maleic anhydride are preferable.

In the present invention, where necessary, conventional additives such as antioxidants, heat stabilizers, light stabilizers, ultraviolet light absorbents, antistatic agents, dispersants, chlorine scavengers, flame retardants, nucleating agents for crystallization, antiblocking agents, anticlouding agents, mold releases, pigments, organic and inorganic fillers, neutralizing agents, lubricants, decomposing agents, metal inactivators, antifouling agents, antibacterial agents, other resins and thermoplastic elastomers may be added to the material having a negative value of the intrinsic birefringence as long as the effects of the present invention are not adversely affected.

The layer comprising the material having a negative value of the intrinsic birefringence may further comprise other materials. However, a layer comprising the material having a negative value of the intrinsic birefringence alone is preferable. A laminate having a layer comprising other materials laminated to at least one face of the layer comprising the material having a negative value of the intrinsic birefringence is preferable. A laminate having layers comprising other materials laminated to both faces of the layer comprising the material having a negative value of the intrinsic birefringence is more preferable.

The processes for producing the layer comprising the material having a negative value of the intrinsic birefringence and the laminate having a layer comprising other materials laminated to at least one face of the layer comprising the material having a negative value of the intrinsic birefringence are not particularly limited. Examples of the process include conventional processes such as the flow coating process using a solution, the injection molding process and the melt extrusion process.

It is preferable that the layer comprising the material having a negative value of intrinsic birefringence is an oriented layer comprising the material having a negative value of intrinsic birefringence. From the standpoint of exhibiting excellent workability, efficiently and easily forming the optically anisotropic member and maintaining stable and uniform phase difference for a long time, it is preferable that the laminate having a layer comprising other materials laminated to at least one face of the layer comprising the material having a negative value of the intrinsic birefringence is an oriented layer. It is more preferable that the laminate having a layer comprising other materials laminated to both faces of the layer comprising the material having a negative value of the intrinsic birefringence is an oriented layer. From the standpoint of efficiently utilizing the phase difference in the layer comprising the material having a negative value of intrinsic birefringence, it is preferable that the layer comprising other materials is a layer having substantially no orientation.

When a layer comprising other materials is laminated to at least one face of the layer comprising the material having a negative value of intrinsic birefringence, the other material used for the lamination is not particularly limited. It is preferable that a transparent resin is laminated to at least one face of the layer comprising the material having a negative value of intrinsic birefringence. By laminating the transparent resin to at least one face of the layer comprising the material having a negative value of intrinsic birefringence, prevention of fracture of the optically anisotropic member and easy control of the wavelength dispersion of the optically anisotropic member are made possible. As the transparent resin, any resin exhibiting a total light transmission of 80% or greater through a thickness of 1 mm can be used without restrictions. Examples of the transparent resin include polymer resins having an alicyclic structure, linear olefin-based polymers such as polyethylene and polypropylene, polycarbonate-based polymers, polyester-based polymers, polysulfone-based polymers, polyether sulfone-based polymers, polystyrene-based polymers, polyvinyl alcohol-based polymers and polymethyl methacrylate-based polymers. Among these polymers, polymer resins having an alicyclic structure and linear olefin-based polymers are preferable, and polymer resins having an alicyclic structure are more preferable due to excellent transparency, small absorption of moisture, dimensional stability and light weight. By laminating the transparent resin to the optically anisotropic member, fracture of the optically anisotropic member during stretching can be prevented, and the optically anisotropic member satisfying the relation of $n_z > n_x > n_y$ can be obtained with stability.

The processes for producing the oriented layer of the layer comprising the material having a negative value of intrinsic birefringence and the oriented layer of the laminate having a layer comprising other materials laminated to at least one face of the layer comprising the material having a negative value of the intrinsic birefringence are not particularly limited. From the standpoint of uniformly and efficiently controlling the refractive index of the optically anisotropic member in the direction of thickness, the process of stretching the layer comprising the material having a negative value of intrinsic birefringence is preferable. In particular, the optically anisotropic member satisfying the relation of $n_z > n_x > n_y$ can be efficiently and easily formed when the layer comprising the material having a negative value of intrinsic birefringence is biaxially stretched.

It is preferable that the layer comprising the material having a negative value of intrinsic birefringence has a structure such that layers comprising other materials are laminated to both faces of the layer comprising the material having a negative value of intrinsic birefringence via a layer of an adhesive resin. Due to this structure, even when the layer comprising the material having a negative value of intrinsic birefringence has a small strength and stretching of the layer alone is difficult, the stretching becomes possible at a temperature where the birefringence is easily exhibited, and the optically anisotropic member having a uniform phase difference over the entire face of the layer can be obtained with excellent productivity without fracture.

The processes for stretching the oriented layer of the layer comprising the material having a negative value of intrinsic birefringence and the oriented layer of the laminate having a layer comprising other materials laminated to both faces of the layer comprising the material having a negative value of the intrinsic birefringence are not particularly limited, and a conventional process can be applied. Examples of the process include uniaxial stretching processes such as the process of uniaxial stretching in the longitudinal direction utilizing the difference in the circumferential speed of rolls, and the process of uniaxial stretching in the transverse direction using a tenter; processes of biaxial stretching such as the process of simultaneous stretching comprising longitudinal stretching by increasing the distance between fixing clips and transverse stretching by an increase in the angle of opening of guide rails, and the process of successive stretching comprising longitudinal stretching utilizing the difference in the circumferential speed of rolls, followed by transverse stretching using a tenter by gripping both end portions by clips; and processes of oblique stretching such as the process using a tenter stretcher which can apply longitudinal or transverse feeding force, tensile force or winding force at different rightward and leftward speeds, or a tenter stretcher which has the same distance of movement with a fixed angle of stretching θ or has different distances of movement while longitudinal or transverse feeding force, tensile force or winding force can be applied at the same rightward and leftward speeds.

As described above, by stretching the layer comprising the material having a negative value of intrinsic birefringence or by stretching the laminate having a layer comprising other materials laminated to at least one face of the layer comprising the material having a negative value of intrinsic birefringence, the refractive index in the direction perpendicular to the direction of stretching of the layer is made greater and the refractive index in the direction of stretching of the layer is made smaller. Thus, the optically anisotropic substance having a uniform phase difference can be efficiently and advantageously prepared.

In the liquid crystal display device of the present invention, the content of the residual volatile components in the optically anisotropic member is preferably 0.1% by weight or smaller and more preferably 0.01% by weight or smaller. When the content of residual volatile components in the optically anisotropic member exceeds 0.1% by weight, there is the possibility that the phase difference is not uniform since the volatile components are discharged to the outside during the use, and internal stress is generated due to a dimensional change formed in the optically anisotropic member. When the contents of residual volatile component in the optically anisotropic member is 0.1% by weight or smaller and more preferably 0.01% or smaller, the liquid display device exhibiting excellent stability of the optical property showing no uneven display of images after the use for a long time can be obtained.

The volatile components are substances contained in the optically anisotropic member in minute amounts and having molecular weights of 200 or smaller, such as residual monomers and solvents. The content of the volatile components can be determined as the total of the amounts of the substances having a molecular weight of 200 or smaller in the analysis of the optically anisotropic member in accordance with the gas chromatography.

The liquid crystal display device of the present invention is a liquid crystal display device of an in-plane switching mode which comprises a pair of polarizers which are a polarizer at an output side and a polarizer at an incident side and disposed at relative positions such that absorption axes of the polarizers are approximately perpendicular to each other and at least an optically anisotropic member and a liquid crystal cell which are disposed between the pair of polarizers, wherein the in-plane slow axis of the optically anisotropic member and the absorption axis of a polarizer disposed closer to the optically anisotropic member are disposed at relative positions approximately parallel or approximately perpendicular to each other.

In the present invention, the angle between two axes is defined as the angle between a plane having one of the axes as the normal and another plane having the other of the axes as the normal, wherein the smaller angle is selected. In the present invention, that two axes are disposed at relative positions approximately parallel to each other means that the angle between the two axes is 0 to 3°, and that two axes are disposed at relative positions approximately perpendicular to each other means that the angle between the two axes is 87 to 90°.

It is preferable that the optically anisotropic member used in the present invention have uniform optical properties. It is more referable that the dispersion of the in-plane retardation is 10 nm or smaller, still more preferably 5 nm or smaller and most preferably 2 nm or smaller. When the dispersion of the in-plane retardation is within the above range, the quality of display of the liquid crystal display device of the present invention can be made excellent. The dispersion of the in-plane retardation means the difference between the maximum value and the minimum value of the in-plane retardation when the in-plane retardation is measured over the entire face of the optically anisotropic members in the condition such that the incident angle of light is 0°, i.e., when the incident light and the surface of the optically anisotropic member used in the present invention are perpendicular to each other.

In the optically anisotropic member used in the present invention, the dispersion of the in-plane slow axis is preferably ±3° or smaller, more preferably ±1° or smaller and most preferably ±0.3° or smaller. When the dispersion of the in-plane slow axis is within the above range, the liquid crystal display device of the present invention can provide excellent display of images without uneven color or defects of color.

As for the dispersion of the slow axis, the slow axis is measured at several portions, and the dispersion of the values obtained in the individual measurements relative to the arithmetic average of the values is used as the dispersion of the slow axis.

The in-plane switching (IPS) mode, which is one of the modes of the liquid crystal display device of the present invention, uses liquid crystal molecules homogenously oriented in the horizontal direction and two polarizers having transmission axes disposed at relative positions perpendicular to each other, one transmission axis being in the vertical direction and the other transmission axis being in the horizontal direction with respect to the front face of the display. Therefore, the sufficient contrast can be obtained since the two transmission axes are in such relative positions that the two transmission axes are seen perpendicularly when the face of the display is observed at a horizontally or vertically oblique angle and, moreover, the homogeneously oriented liquid crystal layer shows little birefringence unlike liquid crystal layers of the twisted mode. However, when the face of the display is observed obliquely at the angle of 45°, the angle between the transmission axes of the two polarizers shifts from 90°, and leak of light takes place due to birefringence of the transmitted light. Therefore, the sufficiently dark color is not obtained, and the contrast decreases. To overcome this drawback, an optically anisotropic member is disposed between two polarizers of the liquid crystal display device of the in-plane switching mode in a manner such that the in-plane slow axis of the optically anisotropic member and the transmission axis of the polarizer disposed closer to the optically anisotropic member are disposed at relative positions approximately parallel or approximately perpendicular to each other. Due to this arrangement of relative positions, the phase difference formed by the liquid crystal in the liquid crystal cell is compensated, and compensation for the angle of field of the polarizer is also achieved. Due to the above effect, the phase difference formed by the transmitted light is effectively compensated to prevent the leak of light, and excellent contrast can be obtained in observation at any of the entire angle. This effect is considered to be exhibited also in the cases of liquid crystal display devices of other modes. In particular, the effect is remarkable in the case of the IPS mode.

In the liquid display device of the present invention, a suitable polarizer which is obtained from a film comprising a suitable conventional vinyl alcohol-based polymer such as polyvinyl alcohol and polyvinyl alcohol with a partial formal treatment after suitable treatments such as the dying with dichroic substances (such as iodine and dichroic dyes), the stretching treatment and the crosslinking treatment in a suitable order in accordance with suitable processes and transmits linearly polarized light on incidence of natural light, can be used. In particular, a polarizer exhibiting excellent transmission of light and degree of polarization is preferable. In general, the thickness of the polarizer is 5 to 80 μm. However, the thickness is not limited to this range.

In general, protective films are attached to both faces of the polarizer, and the obtained laminate is used as a polarizer plate.

As the protective film in the polarizer, a suitable transparent film can be used. In particular, films comprising a polymer exhibiting excellent transparency, mechanical strength, heat stability and property of shielding moisture are preferable.

Examples of the polymer include polymers having an alicyclic structure, polyolefin polymers, polycarbonate polymers, polyester polymers such as polyethylene terephthalate, polyvinyl chloride polymers, polystyrene polymers, polyacrylonitrile polymers, polysulfone polymers, polyether sulfone polymers, polyarylate polymers, acetate polymers such as triacetylcellulose and copolymers of (meth)acrylic acid esters and vinyl aromatic compounds. Among these polymers, triacetylcellulose, polyethylene terephthalate and polymer resins having an alicyclic structure are preferable from the standpoint of transparency and light weight, and polyethylene terephthalate and polymer resins having an alicyclic structure are more preferable from the standpoint of dimensional stability and control of the thickness of the film. The optically anisotropic member used in the present invention can work also as the protective film for the polarizer so that the thickness of the liquid crystal display device can be decreased.

In the present invention, when the optically anisotropic member and the polarizer are in contact with each other, the optically anisotropic member may replace the protective film of the polarizer described above and can be attached to the polarizer using a suitable means such as an adhesive or a pressure-sensitive adhesive.

Examples of the adhesive and the pressure-sensitive adhesive include adhesives and pressure-sensitive adhesives based on acrylic polymers, silicones, polyesters, polyurethanes, polyethers and rubbers. Among these materials, acrylic adhesives and pressure-sensitive adhesives are preferable from the standpoint of heat resistance and transparency.

As the process for lamination, a conventional process for lamination can be used. Examples of the process for lamination include the process of laminating the optically anisotropic member and the polarizer which are each cut into a desired size, and the process of laminating long sheets of the optically anisotropic member and the polarizer in accordance with the roll-to-roll process.

Examples of the polymer resin having an alicyclic structure include norbornene-based polymers, polymers based on cyclic olefins having a single ring, cyclic conjugate diene-based polymers, vinyl alicyclic hydrocarbon polymers and hydrogenation products of these polymers. Among these polymers, norbornene-based polymers are preferable from the standpoint of transparency and the molding property.

Examples of the norbornene-based polymer include ring-opening polymers of norbornene-based monomers, ring-opening copolymers of norbornene-based monomers with other monomers copolymerizable with the norbornene-based monomers in accordance with the ring-opening copolymerization, hydrogenation products of these polymers, addition polymers of norbornene-based monomers and addition-type copolymers of norbornene-based monomers with other monomers copolymerizable with the norbornene-based monomers. Among these polymers, hydrogenation products of ring-opening (co)polymers of norbornene-based monomers are preferable from the standpoint of transparency.

The polymer resin having an alicyclic structure can be selected from conventional polymers disclosed, for example, in Japanese Patent Application Laid-Open No. 2002-321302.

The protective film for the polarizer at the side of vision in the liquid crystal display device of the present invention can be prepared by laminating a hard coat layer and a low refractive index layer in this order.

The hard coat layer is a layer having a great hardness of the surface. Specifically, the hard coat layer is a layer having a hardness of "HB" or harder measured in accordance with the test method of pencil hardness (using a glass plate as the test plate) described in Japanese Industrial Standard K 5600-5-4.

It is preferable that the hard coat layer has a great refractive index. When the hard coat layer has a great refractive index, formation of images due to outside light can be prevented, and a polarizer exhibiting excellent scratch resistance and property for preventing fouling can be prepared. The average thickness of the hard coat layer is not particularly limited. The thickness is, in general, 0.5 to 30 µm and preferably 3 to 15 µm. The great refractive index means a refractive index greater than the refractive index of the low refractive index layer which will be laminated later and is preferably 1.55 or greater. The refractive index can be obtained by using, for example, a conventional spectro-elipsometer.

The material for constituting the hard coat layer is not particularly limited as long as the material exhibits a hardness of "HB" or harder measured in accordance with the test method of pencil hardness (using a glass plate as the test plate) described in Japanese Industrial Standard K 5600-5-4.

Examples of the above material include organic hard coat materials such as organic silicone-based materials, melamine-based materials, epoxy-based materials, acrylic materials and urethane acrylate-based materials; and inorganic hard coat materials such as silicon dioxide-based materials. Among these materials, urethane acrylate-based hard coat materials and polyfunctional acrylate-based hard coat materials are preferable from the standpoint of excellent adhesive ability and productivity.

In the present invention, it is preferable that the hard coat layer has a refractive index of 1.5 or greater, more preferably 1.53 or greater and most preferably 1.55 or greater. When the refractive index of the hard coat layer is in this range, an excellent property of preventing reflection in a wide band range is exhibited, the design of the low refractive index layer to be laminated on the hard coat layer is facilitated, and a laminate film for optical applications exhibiting excellent scratch resistance can be obtained.

It is preferable that the hard coat layer further comprises particles of an inorganic oxide.

By adding particles of an inorganic oxide, a hard coat layer exhibiting excellent scratch resistance and having a refractive index of 1.55 or greater can be easily formed.

As the particles of an inorganic oxide which can be used for the hard coat layer, particles having a great refractive index are preferable. Specifically, particles of an inorganic oxide having a refractive index of 1.6 or greater are preferable, and particles of an inorganic oxide having a refractive index of 1.6 to 2.3 are more preferable.

Examples of the particles of an inorganic oxide having a great refractive index include particles of titania (titanium oxide), zirconia (zirconium oxide), zinc oxide, tin oxide, cerium oxide, antimony pentaoxide, indium oxide doped with tin (ITO), tin oxide doped with antimony (ATO), tin oxide doped with phosphorus (PTO), indium oxide doped with zinc (IZO), zinc oxide doped with aluminum (AZO) and tin oxide doped with fluorine (FTO).

Among these particles, particles of antimony pentaoxide are suitable as a component for adjusting the refractive index due to the great refractive index and excellent balance between electric conductivity and transparency.

The low refractive index layer is a layer having a refractive index smaller than that of the hard coat layer. The refractive index of the low refractive index layer is preferably 1.36 or smaller, more preferably 1.35 to 1.25, and most preferably 1.34 to 1.30. When the refractive index is within the above range, a protective film for a polarizer plate exhibiting excellent balance between visibility, scratch resistance and strength can be formed. The thickness of the low refractive index layer is preferably 10 to 1,000 nm and more preferably 30 to 500 nm.

The material constituting the low refractive index layer is not particularly limited as long as the layer having a refractive index within the above range can be formed. Aero gel is preferable since the control of the refractive index is easy and water resistance is excellent.

The aero gel is a transparent porous substance having minute pores dispersed in a matrix. Most of the pores have a size of 200 nm or smaller. The content of the pore is, in general, 10% by volume or greater and 60% by volume or smaller and preferably 20% by volume or greater and 40% by volume or smaller.

Examples of the aero gel having dispersed minute pores include silica aero gel and porous substances containing hollow particles dispersed in a matrix.

The aero gel can be produced by supercritical drying of a gel-form compound which is obtained by polymerization of an alkoxysilane with hydrolysis, has a skeleton structure of silica and is in the swollen condition, as disclosed in the U.S. Pat. Nos. 4,402,927, 4,432,956 and 4,610,863. The supercritical drying can be conducted, for example, by replacing a portion or the entire amount of a solvent in a gel-form compound with a drying fluid such as carbon dioxide and an alcohol, followed by bringing the resultant compound into a supercritical condition and removing the drying fluid (as a gas) which has changed into the gas phase from the supercritical condition. The silica aero gel may be produced using sodium silicate as the raw material in a manner described above as disclosed in the U.S. Pat. Nos. 5,137,279 and 5,124,364. The refractive index of the silica aero gel can be changed as desired by adjusting relative amounts of raw materials.

Examples of the porous substances containing hollow particles dispersed in a matrix include porous substances in which hollow fine particles having pores at the inside are dispersed in a binder resin as disclosed in Japanese Patent Application Laid-Open Nos. 2001-233611 and 2003-149642.

The binder resin can be selected from resins satisfying requirements such as dispersion of hollow fine particles, transparency of the porous substance and strength of the porous substance. Examples of the binder resin include conventional resins used for coating such as polyester resins, acrylic resins, urethane resins, vinyl chloride resins, epoxy resins, melamine resins, fluororesins, silicone resins, butyral resins, phenol resins, vinyl acetate resins, ultraviolet light curable resins, electron beam curable resins, emulsion resins, water-soluble resins, hydrophilic resins, mixtures of these resins and copolymers and modified substances of these resins; and hydrolyzable organic silicon compounds such as alkoxysilanes and hydrolysis products thereof.

Among the above resins, acrylic resins, epoxy resins, urethane resins, silicone resins, hydrolyzable organic silicon compounds such as alkoxysilanes and hydrolysis products thereof are preferable from the standpoint of dispersion of the fine particles and strength of the porous substance.

The hydrolyzable organic silicon compound such as alkoxysilanes and hydrolysis products thereof are formed from one or more compounds selected from the group consisting of compounds (a) and products (b) and (c) shown in the following:

(a) Compounds represented by formula (6):

(b) Products of partial hydrolysis of at least one of compounds represented by formula (6)

(c) Products of complete hydrolysis of at least one of compounds represented by formula (6)

and have a bond represented by $-(O-Si)_m-O-$ (m representing a natural number) in the molecule.

The hollow fine particles are not particularly limited as long as the particles are fine particles of an inorganic compound. Inorganic fine particles having a hollow formed at the inside of an outer shell are preferable, and silica-based hollow fine particles are more preferable. As the inorganic hollow fine particles, particles having (A) a single layer of an inorganic oxide, (B) a single layer of a complex oxide comprising inorganic oxides of different types and (C) a double layer comprising layers (A) and (B) described above can be used.

The outer shell may be a porous shell having fine open pores or a closed shell having no open pores so that the hollow at the inside is shielded from the outside of the shell. As the outer shell, a coating layer comprising a plurality of coating layers of an inorganic oxide which comprises an inner first coating layer of an inorganic oxide and an outer second coating layer of an inorganic oxide is preferable. By disposing the outer second coating layer of an inorganic oxide at the outside, the outer shell can be made dense by closing pores of the outer shell, or inorganic hollow fine particles having a hollow completely shielded from the outside can be obtained. It is preferable that an organic silicon compound having fluorine atom is used for forming the outer second coating layer comprising an inorganic oxide since the refractive index can be decreased, dispersion into organic solvents can be improved, and the property of preventing fouling can be provided. Examples of the organic silicon compound having fluorine atom include 3,3,3-trifluoropropyltrimethoxysilne, methyl-3,3,3-trifluoropropyldimethoxysilane, heptadecafluorodecylmethyldimethoxysilane, heptadecafluorodecyltrichlorosilane, heptadecafluorodecyltrimethoxysilane, trifluoropropyltrimethoxysilane and tridecafluorooctyltrimethoxysilane.

The thickness of the outer shell is preferably in the range of 1 to 50 nm and more preferably in the range of 5 to 20 nm. When the thickness of the outer shell is smaller than 1 nm, there is the possibility that the inorganic hollow fine particles cannot maintain the prescribed shape. When the thickness of the outer shell exceeds 50 nm, the hollow at the inside of the inorganic hollow particles is small. As the result, there is the possibility that the relative volume of the hollow is decreased, and the decrease in the refractive index is insufficient.

The average diameter of the inorganic fine particles is not particularly limited. The average diameter is preferably 5 to 2,000 nm and more preferably 20 to 100 nm. When the average diameter is smaller than 5 nm, the effect of the hollows to decrease the refractive index is small. When the average diameter exceeds 2,000 nm, transparency extremely deteriorates, and the contribution of diffusion and reflection increases. The average diameter of the fine particles is the number-average diameter obtained by the observation using a transmission electron microscope.

The protective film for the polarizer at the side of vision has a maximum reflectance of light having wavelengths in the range of 430 to 700 nm of preferably 1.4% or smaller and more preferably 1.3% or smaller at an incident angle of 5°. The reflectance of light having a wavelength of 550 nm is preferably 0.7% or smaller and more preferably 0.6% or smaller at an incident angle of 5°.

The maximum reflectance of light having wavelengths in the range of 430 to 700 nm is preferably 1.5% or smaller and more preferably 1.4% or smaller at an incident angle of 20°, and the reflectance of light having a wavelength of 550 nm is preferably 0.9% or smaller and more preferably 0.8% or smaller at an incident angle of 20°.

When each reflectance is within the respective range described above, a polarizer plate showing no images from outside light or glare and providing excellent vision can be obtained.

As for the reflectances described above, the reflectance of light having a wavelength of 550 nm and the maximum reflectance of light having wavelengths in the range of 430 to 700 nm are obtained at incident angles of 5° and 20° using a spectrophotometer (an ultraviolet, visible and near infrared spectrophotometer V-550; manufactured by NIPPON BUNKO Co., Ltd.).

The steel wool test is conducted by reciprocally moving steel wool #0000 ten times on the surface of a protective film of a polarizer at the side of vision under application of a load of 0.025 MPa, and then the change in the condition of the surface after the test is measured.

For evaluation of the change in the reflectance before and after the steel wool test, the measurement is conducted at arbitrarily selected 5 different positions on the surface before and after the test, and the arithmetic average of the obtained values is calculated.

In the above steel wool test, the change in the reflectance on the protective film of a polarizer at the side of vision before and after the test is preferably 10% or smaller and more preferably 8% or smaller. When the change in the reflectance exceeds 10%, blurred images may be formed or glare may arise.

The change in the reflectance before and after the steel wool test is obtained in accordance with the following equation (1). $R^b$ represents the reflectance before the steel wool test, and $R^a$ represents the reflectance after the steel wool test.

$$\Delta R = (R^b - R^a)/R^b \times 100 (\%) \quad (1)$$

Figure 2:
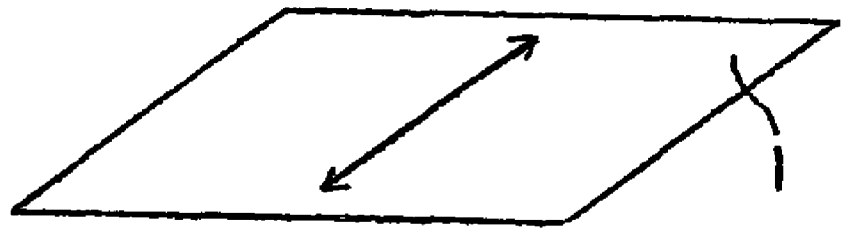
FIG. 2 shows a diagram exhibiting a preferable arrangement in the liquid crystal display device of the present invention.
Figure 2:
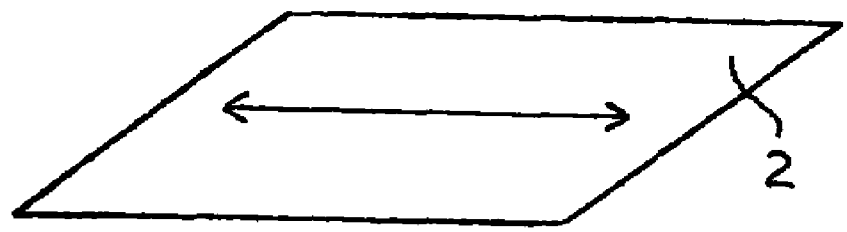
Figure 2:
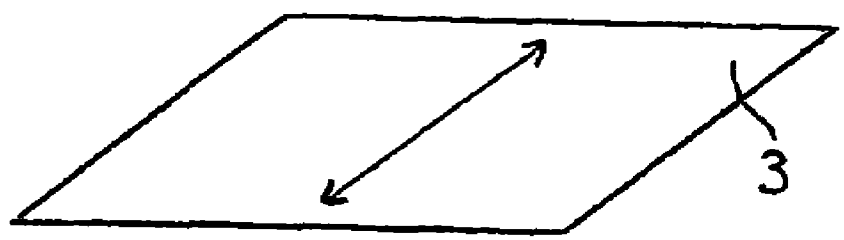
Figure 2:
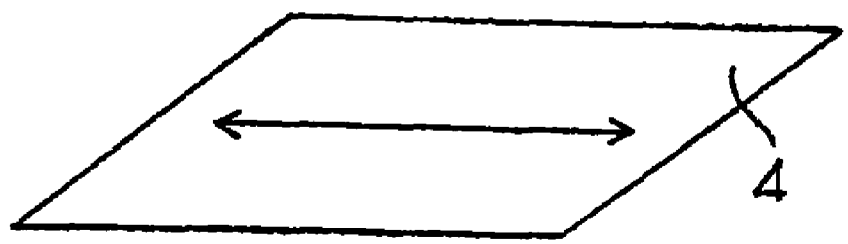

The embodiments of the liquid crystal display device of the present invention comprising the optically anisotropic member comprise 4 embodiments of the preferable arrangement. In the following, 2 embodiments of the preferable arrangement in which "the polarizer of the output side" is placed at the side of vision, and "the polarizer of the incident side" is placed at the side of the back light will be described. The remaining 2 embodiments of the preferable arrangement are embodiments of the preferable arrangement obtained by exchanging the polarizer at the side of vision and the polarizer at the side of the back light with each other (i.e., the arrangement in which "the polarizer of the incident side" is placed at the side of vision, and "the polarizer of the output side" is placed at the side of the back light). These embodiments of the preferable arrangement show the same characteristics of the angle of field with those before the exchange of the polarizer at the side of vision and the polarizer at the side of the back light with each other. For example, the embodiments of the preferable arrangement shown in FIG. 1 and FIG. 2 show the same characteristics of the angle of field with respect to luminance, contrast and color tone. The arrow in the figures shows the absorption axis for the polarizers (1: the polarizer at the incident side; 4: the polarizer at the output side), the in-plane slow axis under application of no voltage for the liquid crystal cell 2, and the in-plane slow axis for the optically anisotropic member 3.

In the first and second embodiments of the preferable arrangement, the optically anisotropic member is disposed between the polarizer at the output side (the polarizer at the side of vision) and the liquid crystal cell of the liquid crystal display device.

(I-1) The First Embodiment of the Preferable Arrangement

Figure 3:
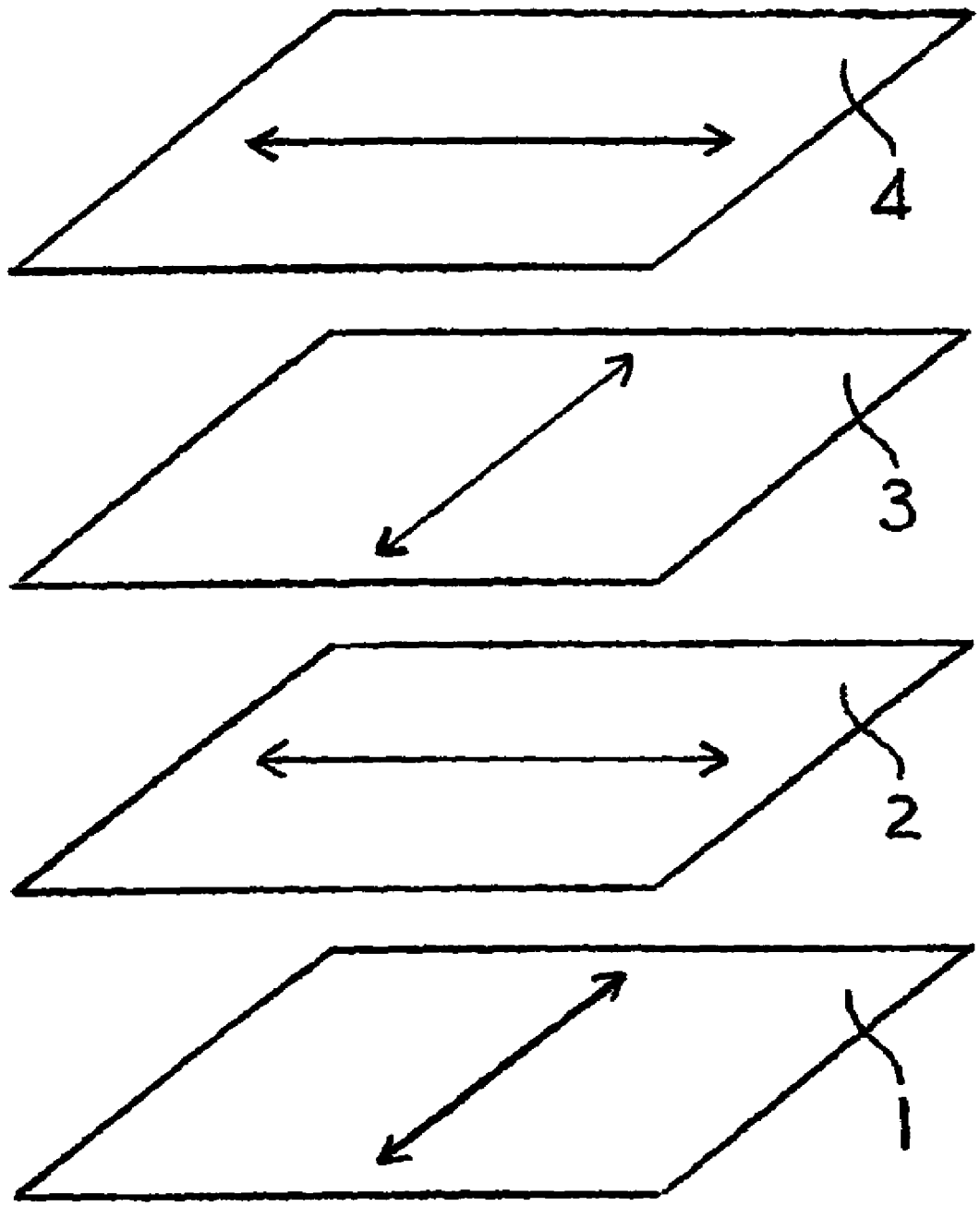
FIG. 3 shows a diagram exhibiting an embodiment having arrangement I-1 in the liquid crystal display device of the present invention.

FIG. 3 shows a diagram exhibiting the first embodiment of the preferable arrangement (referred to as arrangement I-1, hereinafter) of the liquid crystal display device of the present invention. In arrangement I-1, it is preferable that the absorption axis of the polarizer at the output side and the in-plane slow axis of the liquid crystal of the liquid crystal cell under application of no voltage are disposed at relative positions parallel to each other, and the slow axis of optically anisotropic member and the in-plane slow axis of the liquid crystal of the liquid crystal cell under application of no voltage are disposed at relative positions perpendicular to each other. Due to the above relative positions of the optically anisotropic member, the liquid crystal cell and the two polarizers, the minimum value of the contrast can be made 30 or greater at polar angles of 0 to 80°.

(I-2) The Second Embodiment of the Preferable Arrangement

Figure 4:
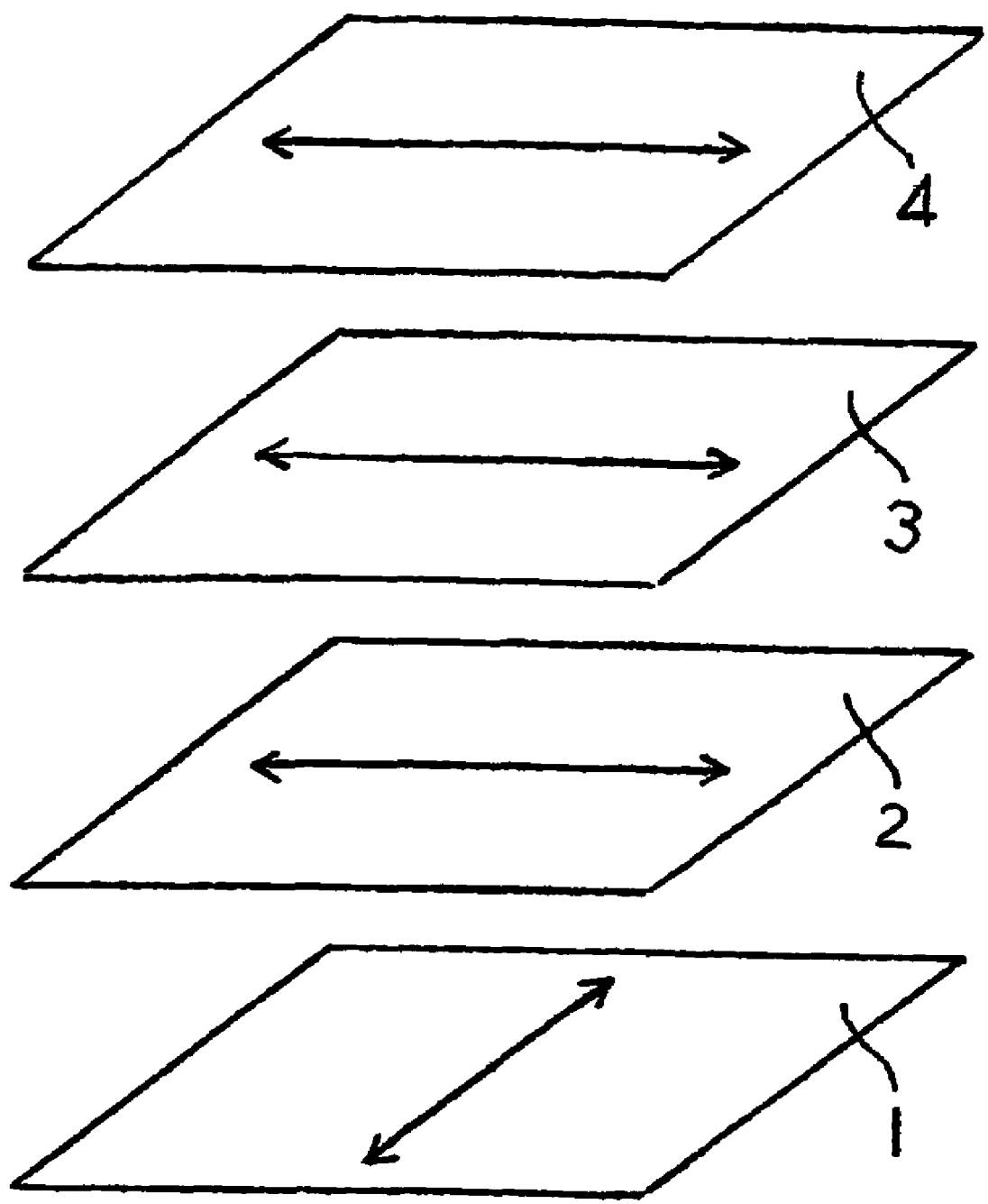
FIG. 4 shows a diagram exhibiting an embodiment having arrangement I-2 in the liquid crystal display device of the present invention.

FIG. 4 shows a diagram exhibiting the second embodiment of the preferable arrangement (referred to as arrangement I-2, hereinafter) of the liquid crystal display device of the present invention. In arrangement I-2, it is preferable that the absorption axis of the polarizer at the output side and the in-plane slow axis of the liquid crystal of the liquid crystal cell under application of no voltage are disposed at relative positions parallel to each other, and the slow axis of optically anisotropic member and the in-plane slow axis of the liquid crystal of the liquid crystal cell under application of no voltage are disposed at relative positions parallel to each other. Due to the above relative positions of the optically anisotropic member, the liquid crystal cell and the two polarizers, the minimum value of the contrast can be made 30 or greater at polar angles of 0 to 80°.

In arrangements I-1 and I-2 the preferable combination of the in-plane retardation $R_e$ (the unit: nm) and the retardation in the direction of the thickness $R_{th}$ (the unit: nm) of the optically anisotropic member is: $100 \leq R_e \leq 400$ and $-500 \leq R_{th} \leq -60$. The more preferable combination is: $160 \leq R_e \leq 340$ and $-350 \leq R_{th} \leq -150$. The still more preferable combination is: $200 \leq R_e \leq 260$ and $-305 \leq R_{th} \leq -205$. The most preferable combination is: $210 \leq R_e \leq 250$ and $-275 \leq R_{th} \leq -235$.

In the present invention, the in-plane retardation $R_e$ and the retardation in the direction of thickness $R_{th}$ can be obtained in accordance with the following equations (2) and (3). In the equations, $n_x$, $n_y$ and $n_z$ each represent the refractive index (-), and d represents the thickness (nm).

$$R_e = (n_x - n_y) \times d \quad (2)$$

$$R_{th} = [(n_x + n_y)/2 - n_z] \times d \quad (3)$$

In the liquid crystal display device of the present invention, suitable members such as prism array sheets, lens array sheets, light diffusion plates, back lights and films for increasing luminance may be disposed at suitable positions as one or more layers.

In the liquid crystal display device of the present invention, a cold cathode tube, a horizontal mercury lamp, a light emitting diode or an electroluminescence device may be used as the back light.

EXAMPLES

The present invention will be described more specifically with reference to examples in the following. However, the present invention is not limited to the examples.

In Example and Comparative Example, a polarizer plate which was a laminate of a polarizer and a protective film for the polarizer [manufactured by SANRITZ Co., Ltd.; HLC 2-5618] was used. As the liquid crystal cell, a liquid crystal cell of the in-plane switching mode having a thickness of 2.74 μm, a positive dielectric anisotropy, a birefringence of Δn=0.09884 at a wavelength of 550 nm and a pretilt angle of 0° was used.

In Example and Comparative Example, measurements and evaluations were conducted in accordance with the following methods.

(1) Thickness

After a laminate for optical applications was embedded into an epoxy resin, the laminate was sliced into pieces having a thickness of 0.05 μm using a microtome [manufactured by YAMATO KOKI KOGYO Co., Ltd.; RUB-2100], and the thickness of each piece was measured by observing the section using a transmission electron microscope.

(2) Glass Transition Temperature

The glass transition temperature was measured in accordance with the method of differential scanning calorimetry (DSC) described in Japanese Industrial Standard K 7121.

(3) Refractive Indices ($n_x$, $n_y$ and $n_z$), Retardations (In-plane Retardation $R_e$ and Retardation in the Direction of Thickness $R_{th}$) and Dispersion of the In-plane Retardation of the Optically Anisotropic Member For the measurement of the refractive index of the optically anisotropic member, the direction of the in-plane slow axis of the anisotropic member with respect to light having a wavelength of 550 nm was measured using an automatic birefringence meter [manufactured by OJI KEISOKUKIKI Co., Ltd.; KOBRA-21]. Then, the refractive index of the anisotropic member in the direction of the slow axis was measured as $n_x$, the refractive index in the direction in-plane and perpendicular to the direction of the slow axis was measured as $n_y$, and the refractive index in the direction of the thickness of the anisotropic member was measured as $n_z$. When the optically anisotropic member was a laminate, $n_x$, $n_y$ and $n_z$ were calculated in accordance with the following equations after the refractive indices ($n_{xi}$, $n_{yi}$ and $n_{zi}$) of each layer had been measured. In each layer of the laminate, the refractive index in the direction parallel to the slow axis of the optically anisotropic substance is represented by $n_{xi}$, the refractive index in the direction in-plane and perpendicular to the slow axis is represented by $n_{yi}$, and the refractive index in the direction of the thickness is represented by $n_{zi}$.

$$n_x=[\Sigma(n_{xi} \times d_i)]/[(\Sigma d_i)]; n_y=[\Sigma(n_{yi} \times d_i)]/[(\Sigma d_i)]; n_z=[\Sigma(n_{zi1} \times d_i)]/[(\Sigma d_i)]$$

wherein Σ means the total sum, each layer in the anisotropic member is indicated by i (i=1, 2 . . . ), and the thickness of each layer is represented by $d_{i1}$, $d_{i2}$ . . . .

The retardations $R_e$ and $R_{th}$ were measured with respect to light having a wavelength of 550 nm using the above automatic birefringence meter.

As for the dispersion of the in-plane retardation, the in-plane retardation was measured at 30 positions arbitrarily selected over the entire surface of the anisotropic member, and the arithmetic average of the obtained values was used as the value of the in-plane retardation. The difference between the maximum value and the minimum value among the values obtained by the measurement was used as the dispersion of the in-plane retardation. For the dispersion of the slow axis, the slow axis was measured at intervals of 10 mm in the transverse direction of the optically anisotropic member. The average of the values obtained by the measurement was obtained, and the dispersion was obtained from the difference between the values obtained by the individual measurement and the average.

(4) Content of Residual Volatile Components

An optically anisotropic member in an amount of 200 g was placed into a tube having an inner diameter of 4 mm used as the container of the sample, which had been treated in advance to completely remove moisture and organic substances adsorbed on the surface. Then, the container was heated at a temperature of 100° C. for 60 minutes, and the gas discharged from the container was continuously trapped. The trapped gas was analyzed by a thermal desorption gas chromatography mass analyzer (TDS-GC-MS), and the total of the contents of components having a molecular weight of 200 or smaller among the components of the gas was obtained and used as the content of residual volatile components.

(5) Refractive Indices of a Hard Coat Layer and a Low Refractive Index Layer

The measurement was conducted at a wavelength of 245 to 1,000 nm and incident angles of 55°, 60° and 65° using a high speed spectroscopic elipsometer [manufactured by J. A. WOOLAM Company; M-2000U], and the refractive indices were obtained by calculation based on the values obtained by the measurement.

(6) Reflectance

The reflection spectrum was measured at an incident angle of 5° using a spectrophotometer [manufactured by NIPPON BUNKO Co., Ltd.; "Ultraviolet, visible and near-infrared spectrophotometer V-570"], and the reflectance at a wavelength of 550 nm and the maximum value of the reflectance at wavelengths in the range of 430 to 700 nm were obtained.

(7) Angle of Field of a Liquid Crystal Display Device

An optically anisotropic member was disposed in a liquid crystal display device of the in-plane switching (IPS) mode, and the display characteristic was examined by visual observation directly in front of the display and in oblique directions at polar angles of 80° and smaller.

(8) Nonuniformity of Luminance

An optically anisotropic member was disposed in a liquid crystal display device of the in-plane switching (IPS) mode. The background of the display was adjusted to the dark display, and the presence or the absence of nonuniformity of luminance (white spots) was examined by visual observation in a dark room directly in front of the display and in upward, downward, rightward and leftward oblique directions each at a polar angle of 40°.

(9) Scratch Resistance

Steel wool #0000 was pressed to a polarizer plate at the side having laminated layers of a hard coat layer and a low refractive index layer. After the steel wool was moved reciprocally 10 times under a load of 0.05 MPa, the condition of the surface of the polarizer plate after the 10 reciprocal movements was visually observed.

Preparation Example 1

Preparation of a Film of an Optically Anisotropic Member

A long sheet of an unstretched laminate which comprised layer [1] comprising a norbornene-based polymer [manufacture by NIPPON ZEON Co., Ltd.; ZEONOR 1020; the glass transition temperature: 105° C.], layer [2] comprising a styrene-maleic anhydride copolymer [manufactured by NOVA CHEMICAL JAPAN Co., Ltd.; DYLARK D332; the glass transition temperature: 130° C.; the content of oligomer components: 3% by weight] and layer [3] comprising a modified ethylene-vinyl acetate copolymer [manufactured by MITSUBISHI KAGAKU Co., Ltd.; MODIC AP A543, the Vicat softening point: 80° C.] and had a structure of layer [1] (15 μm)—layer [3] (5 μm)—layer [2] (110 μm)—layer [3] (5 μm)—layer [1] (15 μm) was obtained in accordance with the coextrusion molding. The long sheet of an unstretched laminate was uniaxially stretched by a tenter in the longitudinal direction at a temperature of 136° C. to a stretching ratio of 1.3 and then in the transverse direction at a temperature of 138° C. to a stretching ratio of 1.2, and an optically anisotropic member having the slow axis in the transverse direction of the film was obtained.

The obtained optically anisotropic member had refractive indices of $n_x$: 1.5823, $n_y$: 1.5800, $n_z$: 1.5837, an in-plane retardation $R_e$ of 230 nm, a retardation in the direction of the thickness $R_{th}$ of −255 nm, a thickness of 10 μm, a dispersion of the in-plane slow axis of ±0.05° and a content of residual volatile components of 0.01% or smaller.

Preparation Example I

Preparation of a Hard Coating Agent

To 100 parts by weight of a modified alcohol sol of antimony pentaoxide [the concentration of solid components: 30% by weight; manufactured by SHOKUBAI KASEI Co., Ltd.], 10 parts by weight of a urethane acrylate of the ultraviolet light curing type [the trade name: SHIKO UV7000B; manufactured by NIPPON GOSEI KAGAKU Co., Ltd.] and 0.4 parts by weight of a photopolymerization initiator [the trade name: IRGACURE 184; manufactured by CIBA GEIGY Company] were mixed, and a hard coating agent of the ultraviolet light curing type was obtained.

Preparation Example II

Preparation of a Coating Fluid for a Low Refractive Index Layer

To 208 parts by weight of tetraethoxysilane, 356 parts by weight of methanol was added. Then, 18 parts by weight of water and 18 parts by weight of 0.01N hydrochloric acid were mixed with the resultant solution, and the obtained mixture was mixed well by a disper. The mixed solution was stirred for 2 hours in a vessel kept at 25° C., and a tetrafunctional silicone resin having a weight-average molecular weight of 850 was obtained. To the tetrafunctional silicone resin, a dispersion sol of hollow silica in isopropanol (IPA) [the content of solid components: 20% by mass; the average diameter of primary particles: 35 nm: the thickness of the outer shell: about 8 nm; manufactured by SHOKUBAI KASEI KOGYO Co., Ltd.] as the component of fine particles of hollow silica was added in an amount such that the ratio of the amounts by mass of solid components in the hollow silica fine particles to those in the tetrafunctional silicone resin (calculated as condensed compounds) was 85/25. The resultant mixture was diluted with methanol so that the content of the entire solid components was 10% by mass, and a coating fluid for a low refractive index layer was obtained.

Preparation Example III

Preparation of a Hard Coat Layer

One face of a long sheet of a polarizer plate [manufactured by SANRITZ Company; HLC2-5618S] was treated by corona discharge for 3 seconds using a high frequency oscillator [CORONA GENERATOR HV05-2; manufactured by TAMTEC Company], and the surface was modified so that the surface tension was 0.072 N/m. The surface modified above was continuously coated with the hard coating agent obtained in Preparation Example I using a die coater in a manner such that the thickness of the hard coat layer obtained after being cured was 5 μm. After the coating layer was dried at 80° C. for 5 minutes, the coating layer was irradiated with ultraviolet light (the accumulated amount of light: 300 mJ/cm$^2$) to cure the hard coating agent, and a long sheet of polarizer plate (C') laminated with the hard coat layer was obtained. The hard coat layer had a thickness of 5 μm, a refractive index of 1.62 and a surface roughness of 0.2 μm after being cured.

Preparation Example IV

Preparation of a Low Refractive Index Layer

The long sheet of polarizer plate (C') laminated with the hard coat layer was coated with the coating fluid for a low refractive index layer obtained in Preparation Example II as the material constituting the low refractive index layer using a wire bar coater. After the heat treatment in the air at 120° C. for 5 minutes, a long sheet of polarizer plate (C) laminated with the low refractive index layer and the hard coat layer in which the low refractive index layer had a thickness of 100 nm was obtained. The refractive index of the obtained low refractive index layer was 1.34.

Example 1

Preparation of a Liquid Crystal Display Device LCD-1

Optical element (a'7) was obtained by laminating a small film having a length of 40 cm and a width of 30 cm obtained by cutting out of the long sheet of the optically anisotropic member obtained in Preparation Example 1 (in a manner such that the transverse direction of the optically anisotropic member was in the longitudinal direction of the small film) and a small film having a length of 40 cm and a width of 30 cm obtained by cutting out of the long sheet of polarizer plate (C) laminated with the low refractive index and the hard coat layer which was obtained in Preparation Example IV in a manner such that the longitudinal directions of the small films were parallel to each other. The angle between the slow axis of the optically anisotropic member and the absorption axis of the polarizer plate was 90°. A plate obtained by cutting out of optical element (a'7) obtained above was used as polarizer plate at the output side (A'7).

A polarizer plate at the output side in a commercial liquid crystal display device of the in-plane switching (IPS) mode was replaced with polarizer plate of the output side (A'7). The members of the liquid crystal display device were arranged in a manner such that the absorption axis of polarizer plate of the output side (A'7) and the in-plane slow axis of the liquid crystal cell under application of no voltage were parallel to each other, and a liquid crystal display device having the structure shown in FIG. 3, LCD-1, was prepared. The obtained device had a structure in which the members were disposed in the following order from the side of vision of the liquid crystal display device: the low refractive index layer, the hard coat layer, the polarizer plate, the film of the optically anisotropic member obtained in Preparation Example 1, the liquid crystal cell and the polarizer plate.

When the property of display of the obtained liquid crystal display device LCD-1 was evaluated by visual observation, it was found that the images of display were excellent and uniform in the observations directly in front of the display and in any oblique directions at angles of 80° and smaller as the polar angle. Nonuniformity of the luminance was not found in the observations directly in front of the display or in any upward, downward, rightward or leftward oblique direction at any angle of 40° or smaller. No reflection of light from the outside was found. The reflectance at the wavelength of 550 nm was 0.54%, and the maximum value of the reflectance at wavelengths in the range of 430 to 700 nm was 1.1%. No scratches were found in the test of scratch resistance.

Comparative Example 1

Polarizer plates in a commercial liquid crystal display device of the in-plane switching (IPS) mode were replaced with other polarizer plates [manufactured by SANRITZ Company; HLC2-5618]. The members of the liquid crystal display device were arranged in a manner such that the absorption axis of the polarizer plate of the output side and the in-plane slow axis of the liquid crystal cell under application of no voltage were parallel to each other, and the absorption axis of the polarizer plate of the incident side and the in-plane slow axis of the liquid crystal cell under application of no voltage were perpendicular to each other, and a liquid crystal display device, LCD-2, was prepared. The obtained device had a structure in which the members were disposed in the following order from the side of vision of the liquid crystal display device: the polarizer plate, the liquid crystal cell and the polarizer plate.

When the property of display of the obtained liquid crystal display device was evaluated by visual observation, it was found that images of display were poor due to insufficient contrast when they were observed in an oblique angle of 45° although the images of display were excellent when they were observed directly in front of the display. Reflection of light from the outside was found. The reflectance at the wavelength of 550 nm was 3.52%, and the maximum value of the reflectance at wavelengths in the range of 430 to 700 nm was 3.56%. Scratches were clearly found in the test of scratch resistance.

INDUSTRIAL APPLICABILITY

The liquid crystal display device of the present invention exhibits excellent antireflection property and scratch resistance, prevents the decrease in contrast in observation of the display at oblique angles without decrease in the quality of the images in observation directly in front of the display, provides a wide angle of field and achieves uniform display of images with great contrast at any angle of observation. The liquid crystal display device of the present invention can be advantageously applied, in particular, to the liquid crystal display devices of the in-plane switching mode.

The invention claimed is:

1. A liquid crystal display device of an in-plane switching mode which comprises a pair of polarizers which are a polarizer at an output side and a polarizer at an incident side and disposed at relative positions such that absorption axes of the polarizers are approximately perpendicular to each other and at least an optically anisotropic member and a liquid crystal cell which are disposed between the pair of polarizers, wherein $n_z > n_x > n_y$ when, with respect to the optically anisotropic member, a refractive index in a direction of an in-plane slow axis is represented by $n_x$, a refractive index in a direction in-plane and perpendicular to the direction of an in-plane slow axis is represented by $n_y$, and a refractive index in a direction of a thickness is represented by $n_z$, each measured using light having a wavelength of 550 nm; and the in-plane slow axis of the optically anisotropic member and the absorption axis of a polarizer disposed closer to the optically anisotropic member are disposed at relative positions approximately parallel or approximately perpendicular to each other, wherein an in-plane retardation $R_e$ (as measured in nanometers) and a retardation in the direction of the thickness $R_{th}$ (as measured in nanometers) of the optically anisotropic member satisfy the following formulae:

$160 \leq R_e \leq 340$ and $-350 \leq R_{th} \leq -150$, wherein the absorption axis of the polarizer at the output side and the in-plane slow axis of a liquid crystal of the liquid crystal cell under application of no voltage are disposed at relative positions parallel to each other, and the optically anisotropic member is disposed between the liquid crystal cell and the polarizer at the output side, and wherein the in-plane slow axis of the optically anisotropic member and the in-plane slow axis of a liquid crystal of the liquid crystal cell under application of no voltage are disposed at relative positions approximately perpendicular to each other.

2. The liquid crystal display device according to claim 1, wherein the optically anisotropic member comprises a layer comprising a material having a negative value of intrinsic birefringence.

3. The liquid crystal display device according to claim 2, wherein the layer comprising a material having a negative value of intrinsic birefringence is a laminate comprising a layer of a transparent resin which is laminated to at least one face of a layer of the material having a negative value of intrinsic birefringence.

4. The liquid crystal display device according to claim 3, wherein the transparent resin is a polymer resin having an alicyclic structure.

5. The liquid crystal display device according to claim 3, wherein the laminate is obtained by stretching a laminate of a layer of a material having a negative value of intrinsic birefringence and a layer of a transparent resin which is laminated to at least one face of the layer of the material having a negative value of intrinsic birefringence.

6. The liquid crystal display device according to claim 3, wherein the laminate is obtained by coextrusion molding of the transparent resin and the material having a negative value of the intrinsic birefringence.

7. The liquid crystal display device according to claim 3, wherein the transparent resin is a resin exhibiting a total light transmission of 80% or greater through a thickness of 1 mm.

8. The liquid crystal display device according to claim 2, wherein the layer comprising a material having a negative value of intrinsic birefringence is a laminate having layers each comprising transparent resin are laminated to both faces of the layer comprising the material having a negative value of the intrinsic birefringence.

9. The liquid crystal display device according to claim 1, wherein a content of residual volatile components in the optically anisotropic member is 0.1% by weight or smaller.

10. The liquid crystal display device according to claim 1, wherein a protective film of a polarizer at a side of vision in the liquid crystal display device comprises a low refractive index layer which is formed with aero gel and has a refractive index of 1.36 or smaller.

* * * * *